United States Patent [19]

Beechler

[11] Patent Number: 5,339,922

[45] Date of Patent: Aug. 23, 1994

[54] TREE STAND FOR HUNTERS

[75] Inventor: Robert C. Beechler, Midlesboro, Ky.

[73] Assignee: Richard Benante, Cumberland Gap, Tenn.

[21] Appl. No.: 152,187

[22] Filed: Nov. 15, 1993

[51] Int. Cl.[5] .............................................. A01M 31/02
[52] U.S. Cl. .................................... 182/188; 182/187; 182/223
[58] Field of Search ........ 182/187, 188, 223, 133–135; 108/152

[56] References Cited

U.S. PATENT DOCUMENTS

| | | | |
|---|---|---|---|
| 4,134,474 | 1/1979 | Stavenau et al. | 182/187 |
| 4,445,591 | 5/1984 | Mitchell | 182/222 |
| 4,475,627 | 10/1984 | Eastridge | 182/187 |
| 4,605,097 | 8/1986 | Maxwell | 182/92 |
| 4,782,918 | 11/1988 | Brunner et al. | 182/187 |
| 4,995,475 | 2/1991 | Berkbuegler | 182/187 |
| 5,105,910 | 4/1992 | Engstrom | 182/187 |

OTHER PUBLICATIONS

*Bowhunters Discount Warehouse, Inc.,* 1993 catalog, pp. 114–134.

*Primary Examiner*—Alvin C. Chin-Shue
*Attorney, Agent, or Firm*—Pitts & Brittian

[57] ABSTRACT

A tree stand (10) for supporting a person such as a hunter or photographer at a selected elevation above the ground by securing the tree stand (10) to the trunk of a tree. The tree stand (10) includes a seat assembly (112) connected to a platform (12), the seat (112) being movable with respect to the platform (12) and the platform (12) being collapsible to reduce its overall length and width. The platform (12) includes a plurality of extendable panels (18) positioned one next to another, each including a plurality of extension sections (20) cooperating one with another in telescoping fashion. Extension locking mechanisms (50) are provided to selectively lock the relative position of each extension section (20) at least within its receiving extension section (20). A securement assembly (80) is provided for securing the platform (12) to a selected tree and includes at least a retaining strap (82) and a tree engagement device (98). A pair of support cables (104) are secured between the retaining strap (82) assembly and the platform second end extension section (20C). The seat assembly (112) includes a seat support member (114) and a seat member (126), the seat member (126) being collapsible into at least a portion of one of the extendable panels (20).

9 Claims, 3 Drawing Sheets

TREE STAND FOR HUNTERS

TECHNICAL FIELD

This invention relates to the field of hunting. More specifically, this invention relates to a portable tree stand for elevating a hunter or photographer above the ground a selected height. The portable tree stand includes at least a collapsible platform to enhance the portability thereof.

BACKGROUND ART

In the field of hunting, it is well known that hunters often elevate themselves above the ground in an attempt to go unnoticed by the game for which they are hunting. It is also well known that wildlife photographers often practice the same technique. Reference to hunters hereinafter will also include wildlife photographers and any other persons who hunt or observe wild game. Elevating one's self above the ground may be accomplished by erecting a temporary or permanent hunting stand. Alternately, the hunter may use a portable seat which may be secured to a tree at a selected elevation above the ground. The portable tree stand is often preferable to the hunting stand because the hunter is not limited to a specific location from which to hunt. If the game are not prevalent in the selected location, the hunter may relocate to another tree in another area.

To serve the purposes set forth, several other devices have been produced. Typical of the art are those devices disclosed in the following U.S. Pat. Nos.:

| U.S. Pat. No. | Inventor(s) | Issue Date |
| --- | --- | --- |
| 4,445,591 | P. M. Mitchell | May 1, 1984 |
| 4,475,627 | W. K. Eastridge | Oct 9, 1984 |
| 4,605,097 | T. L. Maxwell | Aug 12, 1986 |
| 4,782,918 | P. B. Brunner, et al. | Nov 8, 1988 |
| 4,995,475 | R. L. Berkbuegler | Feb 26, 1991 |
| 5,105,910 | J. C. Engstrom | Apr 21, 1992 |

Of these patents, the Mitchell ('591) and Maxwell ('097) devices are for use in trees have converging limbs or trunks, with the devices being supported by the diverging limbs or trunks. These devices obviously require that the hunter locate a tree in which the device may be properly nested in order to support the weight of the device, the hunter, and any equipment the hunter is carrying. When such a tree is located, the hunter or photographer has no means of varying the elevation above the ground at which he/she desires to be positioned.

The device disclosed by Berkbuegler ('475) is a platform which may be secured to the trunk of a tree and upon which the hunter may be seated. Of course, an independent seat may be placed upon the platform if so desired by the hunter. However, the '475 device does not allow for the collapsibility of the platform to enhance the portability aspects thereof.

Those device taught by Eastridge ('097), Brunner, et al. ('918), and Engstrom ('910) each show a combination platform and seat which may be secured to the trunk of a tree for the use of a hunter. The structure of each of these devices is collapsible to a certain extent, that being that the seat is movable with respect to the platform. As shown by Eastridge, the seat support may be removed from the platform and received underneath the platform at an orientation substantially parallel thereto in order to transport the platform. Although these devices teach at least partial collapsibility, none teaches a collapsible platform.

Therefore, it is an object of this invention to provide a device for supporting a hunter or photographer at a selected elevation above the ground in a tree, the device being collapsible in order to enhance the portability aspects of the device.

Another object of the present invention is to provide a device which includes a platform and a seat, the seat being securable to the platform and selectively collapsible thereon.

Still another object of the present invention is to provide a device which includes at least a platform upon which a person may be supported, the platform being collapsible in order to reduce the length and width thereof, the platform remaining a single unit after being collapsed.

DISCLOSURE OF THE INVENTION

Other objects and advantages will be accomplished by the present invention which serves to support a person such as a hunter or photographer at a selected elevation above the ground by securing the tree stand to the trunk of a tree. The tree stand includes a seat connected to a platform, the seat being movable with respect to the platform and the platform being collapsible to reduce its overall length and width.

The platform is comprised of a plurality of extendable panels positioned one next to another. Each extendable panel is comprised of a plurality of extension sections cooperating one with another in telescoping fashion. The first extension section of each extendable panel is secured to an adjacent extendable panel using a hinge member.

Extension locking mechanisms are provided to selectively lock the relative position of each extension section within its receiving extension section and the relative positions of each pair of successive extension sections. Each extension locking mechanism includes a pin member defining a ninety degree (90°) elbow at a proximal end. The pin member is carried within a barrel defined by a housing and is received through openings in the particular extension section to which the extension locking mechanism is secured, and in the extension sections within which that section is received and to which it may be adjacent.

In order to maintain the extension of the pin member, a biasing member may be provided, which may be a compression spring carried within the barrel between the proximal end thereof and the pin member elbow.

Collapsing the extendable panel may be facilitated by retracting each pin member associated with an extension section and pushing that extension section toward the receiving extension section. In order to further collapse the platform, the adjacent extendable panels are hinged together such that each extendable panel folds over or under an adjacent extendable panel.

In order to secure the platform to a selected tree at a selected elevation above the ground, a securement assembly is provided. The securement assembly is carried by the platform and includes at least a retaining strap and a tree engagement device. The retaining strap is secured at either end to a hinge assembly carried by the upper end of a seat support and may be any conventional strap securable in any conventional manner.

The tree engagement device includes a pair of spaced apart engagement members carried by the proximal end of the platform first end extension section of the intermediate extendable panel. Each engagement member terminates in a pointed configuration to engage the tree and slightly penetrate the surface thereof in order to prevent the platform from twisting around the tree. With the retaining strap secured proximate the top of the seat support member and the engagement members disposed proximate the bottom of the platform, the tree stand is secured from any substantial movement in relation to the tree.

A pair of support cables are secured between the retaining strap assembly and the platform second end extension section. Each cable terminates in an eyelet for receiving a selected connecting device such as a screw or bolt. One cable end is connected to the hinge assembly using the same fastener used to connected the bracket thereto. The other end of the cable is connected to a clevis provided at the distal end of the second end extension member, proximate the outermost corner of the respective side of the platform. One cable is provided on each side of the platform. The cable attached to the first extendable panel also serves to prevent that panel from collapsing under the second extendable panel.

The seat assembly includes a seat support member disposed between the tree engagement members and extending upwardly away from the platform. A fastening assembly is provided for securing the seat support member to the platform, and about which the seat assembly may be pivoted. The seat support member is a tubular member. An attachment member is provided for attaching the seat to the seat support member. The attachment member includes a linear member secured under the seat in a conventional manner. The linear member defines a configuration such as to be closely received within the seat support member in at least one selected orientation and at at least one selected height with respect to the platform.

The position of the linear member within the seat support member may be locked at a selected location using a position locking device. A plurality of openings is defined by the seat support member and a push-button type pin is carried by the linear member, the pin being positioned to be received through one of the openings. This type of position locking device may be incorporated on opposing sides of the seat support member.

The seat is secured to the linear member of the preferred embodiment using a hinge member. The hinge member is oriented with the hinge pin toward the front of the seat. A pin member secured to the linear member is biased through a pin receptor secured to the underneath portion of the seat such that when a person is seated on the seat, the seat will not collapse forward. However, when the linear member is removed from the seat support member, reversed in orientation, and replaced within the seat support member, the pin may be retracted to allow the seat to collapse.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A tree stand for hunters incorporating various features of the present invention is illustrated generally at 10 in the figures. The tree stand for hunters, or tree stand 10, is designed for supporting a person such as a hunter or photographer at a selected elevation above the ground by securing the tree stand 10 to the trunk of a tree. Moreover, in the preferred embodiment the tree stand 10 includes a seat 112 connected to a platform 12, the seat 112 being movable with respect to the platform 12 and the platform 12 being collapsible to reduce its length and width. As will be seen, the seat 112 may be folded at least partially into a portion of the collapsed platform 12 in order to render the tree stand 10 compact for carrying.

Figure 1:
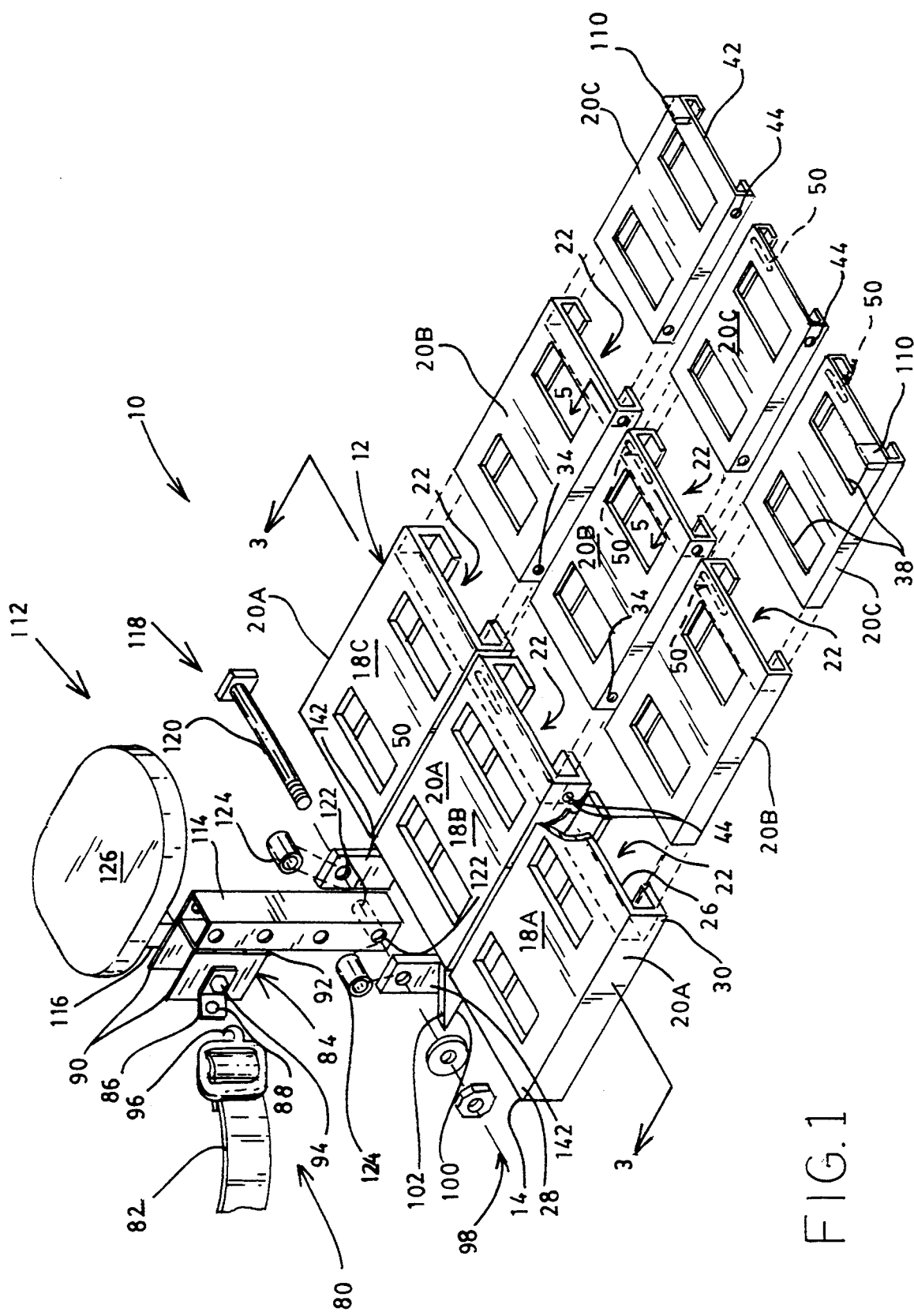
FIG. 1 is a perspective view of the tree stand for hunters constructed in accordance with several features of the present invention.

As illustrated in FIG. 1, the tree stand 10 of the present invention is comprised generally of a platform 12 and a seat assembly 112. The platform 12 is comprised of a plurality of extendable panels 18 positioned one next to another. Shown and described are three such extendable panels 18. However, it is envisioned that more or fewer than three extendable panels 18 may be incorporated in similar fashion with similar results.

In the preferred embodiment, each extendable panel 18 is comprised of a plurality of extension sections 20 cooperating one with another in telescoping fashion. To this extent, as illustrated, three such sections 20 may be incorporated, including a first end section 20A, an intermediate section 20B, and a second end section 20C. It will be seen that more or fewer than three sections 20 may be incorporated in similar fashion and with similar results.

As shown, each extension section 20 includes a substantially planar top surface 28. Channels 30 are defined by opposing sides. The channels 30 depend downward from the top surface and terminate in a direction toward the center of the extension section 20 such that the opposing channels 30 cooperatively define a receptor 22 for the next successive section 20. The top surface 28 of each successive section 20 defines a width and the channels 30 define a height to allow that extension section 20 to be closely received within the receptor 22 defined by the preceding extension section 20. Openings 38 may be defined within the top surface 28 of any or all of the extension sections 20 in order to reduce the overall weight of the tree stand 10 and to allow for the drainage of rain water. It will be understood that the openings 38 may be as illustrated or in any other selected orientation and quantity as long as the provision of openings does not degrade the structural integrity of the tree stand 10.

Figure 5:
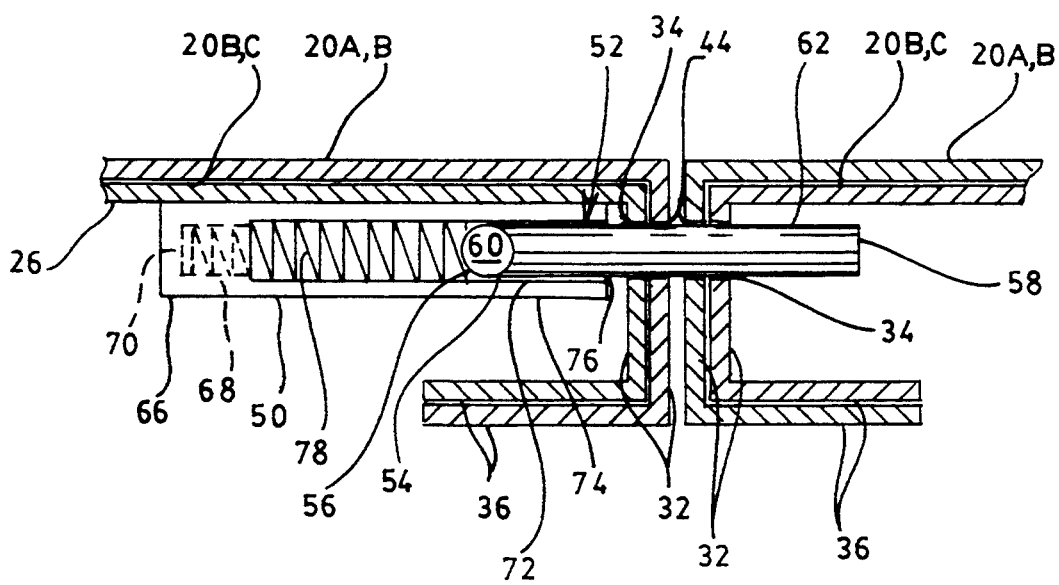
FIG. 5 illustrates a front elevational view, in section, of one embodiment of the extension locking mechanism incorporated in the tree stand for hunters of the present invention taken at 5—5 of FIG. 1.

Extension locking mechanisms 50 are provided to selectively lock the relative positions of each pair of successive extension sections 20. FIG. 5 most clearly illustrates the preferred embodiment of an extension locking mechanism 50. As shown, each extension locking mechanism 50 includes a pin member 52 defining a ninety degree (90°) elbow 54 at a proximal end 56. The pin member 52 is received within a barrel 68 defined by a housing 66. A slotted opening 72 is defined by the wall of the housing 66 and is dimensioned to receive the shorter leg 60 of the pin member 52. As shown, the slotted opening 72 may be defined proximate a side portion of the housing 66. However, it will be understood that the slotted opening 72 may be defined at any other selected location such as proximate the bottom of the housing 66. As shown, the slotted opening 72 defines a width such as to receive the shorter leg 60 of the pin member 52, the shorter leg 60 being substantially similar in diameter as the longer leg 62 of the pin member 52. However, it will be understood that, though not shown, the slotted opening 72 may define a width smaller than the diameter of the longer leg 62 of the pin member 52, the shorter leg 60 defining a smaller diameter than the width of the slotted opening 72 at least at the portion extending through the slotted opening 72. This may be accomplished, for example, by defining a notched portion in the shorter leg 60 of the pin member 52 for being received in the slotted opening 72.

The shorter leg 60 of the pin member 52 extends away from the housing 66 such that it may be engaged by a user in order to manipulate the pin 52 within the barrel 68. The distal end 58 of the pin member 52 extends from the barrel 68 which opens on the distal end 74 of the housing 66.

The extension locking mechanism housing 66 is carried on an underneath surface 26 of an extension section 20 proximate the depending portion 32 of one of the channels 30, that portion 32 of the channel 30 defining a through opening 34 for receiving the distal end 58 of the pin member 52. A cooperating opening 44 defined by the depending portion 32 of the channel 30 defined by the extension section 20 within which the subject extension section 20 is received is defined proximate the distal end 42 thereof for receiving the distal end 58 of the pin member 52 such that the relative positions of the two extension sections 20 may be substantially fixed. A further cooperating opening 44 defined by a depending portion 32 of a channel 30 defined by one or more extension sections 20 of an adjacent extendable panel 18 may be provided for also receiving the distal end 58 of the pin member 52 such that the relative positions of the adjacent extension sections 20 may be substantially fixed. Therefore, when the pin member 52 is fully extended, the distal end 58 thereof extends from the distal end 74 of the housing 66 through at least openings 34,44 defined by the respective depending portions 32 of the channels 30 defined by the subject extension section 20 and the receiving extension section 20, and foreseeably through openings 34,44 defined by the respective depending portions 32 of the channels 30 defined by one or more extension section 20 comprising an adjacent extendable panel 18.

In order to maintain the extension of the pin member 52, a biasing member 78 may be provided. As shown, the biasing member 78 may be a compression spring carried within the barrel 68 between the proximal end 70 thereof and the pin member elbow 54. The spring member 78 may be fixed at one end to the pin member 52 in a conventional manner such as by tack welding. The biasing means 78 may otherwise be any other conventional device for biasing the pin member 52 in the selected direction.

Collapsing the extendable panel 18 may be facilitated by retracting each pin member 52 associated with an extension section 20 and pushing that extension section 20 toward the receiving extension section 20. The depending portion 32 of the channel 30 defined by the receiving extension section 20 serves to retain the pin member 52 in a retracted position. Though not shown, it is foreseeable to provide openings in the channel member depending portions 32 at the proximal ends 40 thereof in order to receive the distal ends 58 of the pin members 52 in order to lock the extendable panels 18 in a collapsed fashion.

Figure 3:
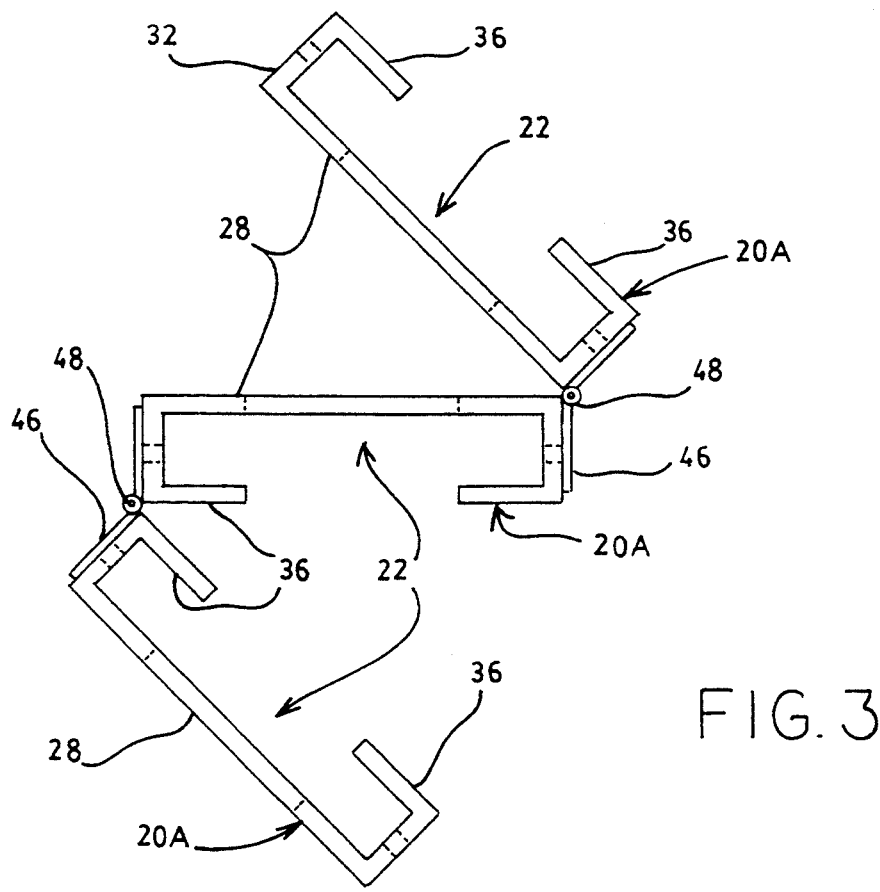
FIG. 3 is a side elevation view, in section, of the tree stand for hunters taken at 3—3 of FIG. 1.

In order to further collapse the platform 12, the adjacent extendable panels 18 are hinged together such that each extendable panel 18 folds over or under an adjacent extendable panel 18. As shown most clearly in FIG. 3, each pair of adjacent first end extension sections 20A are connected one to the other using at least one hinge 46. In the event that only two extendable panels 18 are incorporated to define the platform 12, the hinge 46 may be oriented such that the two panels 18 fold over in either direction, i.e., either the terminating portions 36 of the channels 30 or the top surfaces 28 of the first end sections 20A abut. However, if more than two extendable panels 18 comprise the platform 12, the orientation of each successive hinge 46 must be opposite that of the previous hinge 46. As illustrated, the hinge 46 connecting the first extendable panel 18A to the intermediate or second extendable panel 18B is oriented such that when folded, the terminating portions 36 of the channels 30 defined by each are in abutment. The hinge 46 connecting the second and third extendable panels 18B,C is oriented such that the top surfaces 28 of each are in abutment when the platform 12 is folded.

In order to secure the platform 12 to a selected tree at a selected elevation above the ground, a securement assembly 80 is provided. The securement assembly 80 is carried by the platform 12 and includes at least a retaining strap 82 and a tree engagement device 98. In the preferred embodiment, the retaining strap 82 is secured at either end to a hinge assembly 84 carried by the upper end of a seat support 114. The retaining strap 82 may be any conventional strap and may be securable in any conventional manner such as that indicated by hooks 96 to be received within openings 88 in bracket members 86 carried by the hinge assembly 84. Adjustment means (not shown) may be carried by the retaining strap 82 to tighten the retaining strap 82 around the selected tree.

The hinge assembly 84 illustrated comprises two hinges 90, each being secured to the upper portion of the seat support member 114. The hinge pin 92 of each hinge 90 is positioned proximate an edge of the seat support 114, with one hinge pin 92 proximate each side thereof. When in the collapsed position, the hinges 90 may be folded so as to require minimal space. The hinges 90 may be any conventional hinge such as one to open a maximum of ninety degrees (90°), or may be provided with some other means for securing their relative positions with each other when in the open position shown in FIGS. 1 and 2.

Figure 2:
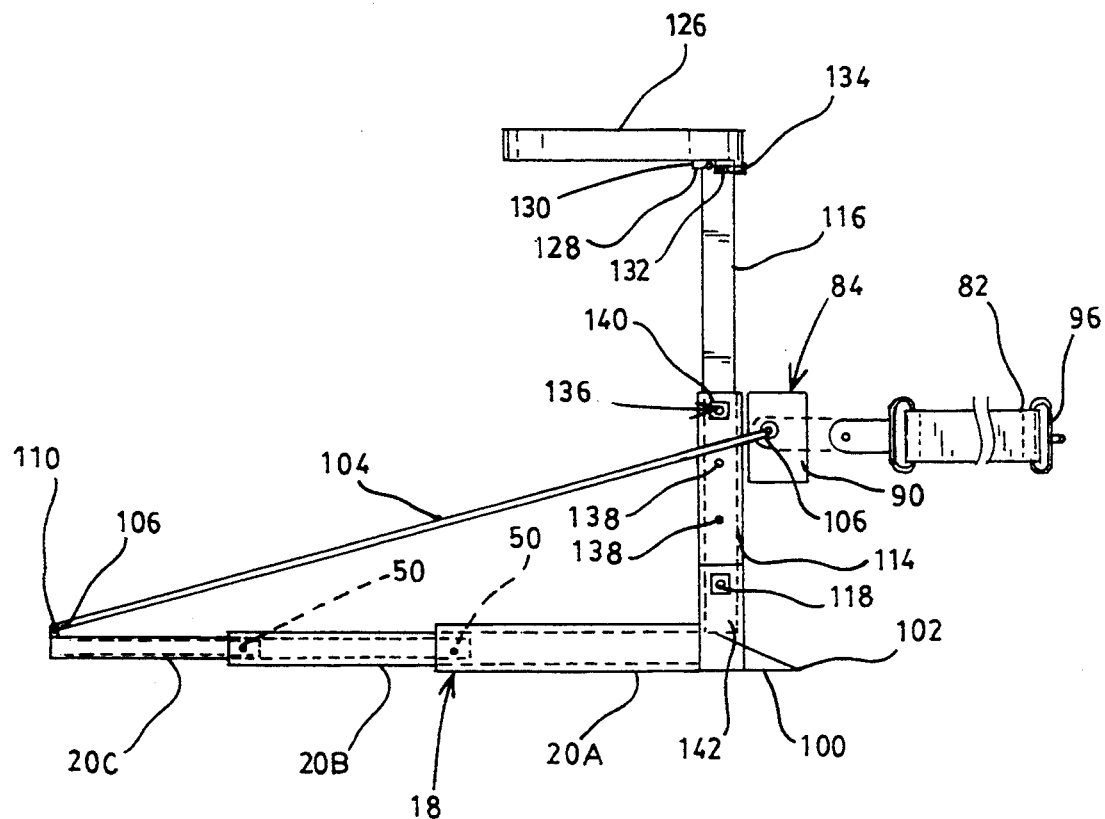
FIG. 2 illustrates a side elevation view of the tree stand for hunters of the present invention as illustrated in FIG. 1.
Figure 4:
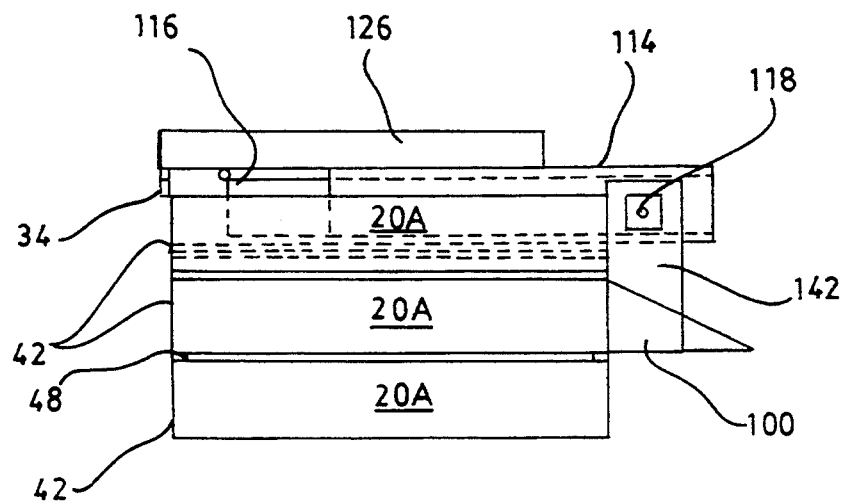
FIG. 4 illustrates a side elevation view of the present invention as illustrated in FIG. 1, the tree stand for hunters being in a collapsed disposition.

As illustrated in FIGS. 1, 2 and 4, the tree engagement device 98 of the preferred embodiment includes a pair of spaced apart engagement members 100 carried by the proximal end 14 of the platform first end extension section 20A of the intermediate extendable panel 18B. Each engagement member 100 terminates in a pointed configuration as illustrated at 102 to engage the tree and slightly penetrate the surface thereof in order to prevent the platform 12 from twisting around the tree. With the retaining strap 82 secured proximate the top of the seat support member 114 and the engagement members 100 disposed proximate the bottom of the platform 12, the tree stand 10 is secured from any substantial movement in relation to the tree.

In order to add structural stability to the platform 12, and more specifically to reduce the moments created at the proximal end 14 of the platform 12 due the cantilever thereof, a pair of support cables 104 are secured between the hinge assembly 84 and the platform second end extension sections 20C. As illustrated, each cable 104 terminates in an eyelet 106 for receiving a selected connecting device such as a screw or bolt. One cable end 106 is connected to the hinge assembly 84 using the same fastener 94 used to connect the bracket 86 thereto. The other end of the cable 106 is connected to a clevis 110 provided at the distal end 42 of the second end extension member 20C, proximate the outermost corner of the respective side of the platform 12. As illustrated, one cable 104 is provided on each side of the platform 12.

It will be noted that the cable 104 attached to the first extendable panel 18A also serves to prevent that panel 18A from collapsing under the second extendable panel 18B as the hinge 46 is oriented with the hinge pin 48 toward the bottom of the platform 12.

In order to allow the user to comfortably be stationed on the tree stand 10, a seat assembly 112 is provided. To this extent, the seat support member 114 is disposed between the tree engagement members 100 and extends upwardly away from the platform 12. A fastening assembly 118 is provided for securing the seat support member 114 to the platform 12. As illustrated, the fastening assembly 118 of the preferred embodiment includes a bolt 120 received through cooperating openings 122 defined by the seat support member 114 and by each of a pair of extension members 142, one each of the extension members 142 being secured to one each of the tree engagement members 100. A spacer 124 may be disposed between the seat support member 114 and each of the extension members 142 to prevent lateral movement of the seat 126. When the tree stand 10 is disengaged from a tree, the seat support member 114 may be pivoted about the fastening assembly bolt 120 such that, as illustrated in FIG. 4, it may be received between the channel members 30 defined by the uppermost extendable panels 18. However, it will be understood that the seat support member 114 may be secured to the platform 12 in any other conventional fashion.

As illustrated, the seat support member 114 of the preferred embodiment is a tubular member such as tube steel. An attachment member 116 is provided for attaching the seat 126 to the seat support member 114. As illustrated, the attachment member 116 includes a linear member secured under the seat 126 in a conventional manner. The attachment member 116 defines a configuration such as to be closely received within the seat support member 114 in at least one selected orientation and at at least one selected height with respect to the platform 12. In the preferred embodiment, the attachment member 116 may be received within the seat support member 114 in at least two selected orientations, those being at one hundred-eighty degrees (180°) with respect to each other, the rationale for this to be described below.

In the preferred embodiment, the position of the attachment member 116 within the seat support member 114 may be locked at a selected location using a position locking device 136. As illustrated, a plurality of openings 138 is defined by the seat support member 114 and a push-button type pin 140 is carried by the attachment member 116, the pin 140 being positioned to be received through one of the openings 138. This type of position locking device 136 may be incorporated on opposing sides of the seat support member 114 if desired. It is foreseeable that other conventional position locking devices 136 may be used as well.

The seat 126 is secured to the attachment member 116 of the preferred embodiment using a hinge member 128. The hinge member 128 is oriented with the hinge pin 130 toward the front of the seat 126. A pin member 132 secured to the attachment member 116 is biased through a pin receptor 134 secured to the underneath portion of the seat 126 such that when a person is seated on the seat 126, the seat 126 will not collapse forward. However, when the attachment member 116 is removed from the seat support member 114, reversed in orientation, and replaced within the seat support member 114, the pin 132 may be retracted to allow the seat 126 to collapse into the orientation illustrated in FIG. 4. When in this orientation, the tree stand 10 may be secured with the retaining strap 82 normally used to secure the tree stand 10 to the selected tree.

In order to use the tree stand 10 of the present invention, the hunter, or other user, will select an appropriately positioned tree. The user will then climb the tree using any conventional methods and devices. Once at the selected elevation in the tree, the user will remove the retaining strap 82 from around the collapsed tree stand 10, place the retaining strap 82 around the tree and secure the ends to the hinge assembly 84. The seat 126 is removed, reoriented, and replaced. The extendable panels 18 are folded away from each other and the individual extension sections 20 are pulled out until the respective position locking mechanisms 50 halt such extension. The cables 104 are then secured in place and the tree stand 10 is operable. Break down of the tree stand 10 is in similar but opposite fashion.

From the foregoing description, it will be recognized by those skilled in the art that a tree stand for hunters offering advantages over the prior art has been provided. Specifically, the tree stand for hunters provides a means for supporting a hunter at a selected elevation above the ground in a tree, the tree stand having a platform and a seat which are collapsible to enable the user to more easily transport the same.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A tree stand for supporting a user at a selected elevation above the ground in a tree, said tree stand comprising:
    a platform, said platform including a plurality of extendable panels, said plurality of extendable panels being positioned one next to another and secured one to another in a pivoting fashion;
    a seat assembly pivotally connected to said platform; and a securement assembly carried by said platform and said seat assembly for securing said tree stand to a tree.

2. The tree stand of claim 1 wherein each of said extendable panels includes a plurality of extension sections cooperating one with another in a telescoping fashion, each of said extension sections defining a top planar surface and a pair of oppositely disposed and downwardly depending channels, said channels being provided for receiving a successive one of said plurality of extension sections.

3. The tree stand of claim 2 further comprising at least one extension locking mechanism for fixing a relative position between at least two each of said plurality of extension sections.

4. The tree stand of claim 1 further comprising a pair of oppositely disposed support cables, each of said support cables being secured at one end to said seat assembly and at a second end to a distal end of said platform.

5. The tree stand of claim 1 wherein said securement assembly includes a retaining strap and a tree engagement device, said retaining strap secured at first and second ends proximate an upper portion of said seat assembly and around a tree, said tree engagement device being carried by a proximal end of said platform and configured to engage a portion of a tree.

6. A tree stand for supporting a user at a selected elevation above the ground in a tree, said tree stand comprising:
   a platform, said platform including a plurality of extendable panels, said plurality of extendable panels being positioned one next to another and secured one to another in a pivoting fashion, each of said extendable panels including a plurality of extension sections cooperating one with another in a telescoping fashion, each of said extension sections defining a top planar surface and a pair of oppositely disposed and downwardly depending channels, said channels being provided for receiving a successive one of said plurality of extension sections;
   a seat assembly pivotally connected to said platform;
   a securement assembly carried by said platform and said seat assembly for securing said tree stand to a tree; and
   a pair of oppositely disposed support cables, each of said support cables being secured at one end to said seat assembly and at a second end to a distal end of said platform.

7. The tree stand of claim 6 further comprising at least one extension locking mechanism for fixing a relative position between at least two each of said plurality of extension sections.

8. The tree stand of claim 1 wherein said securement assembly includes a retaining strap and a tree engagement device, said retaining strap secured at first and second ends proximate an upper portion of said seat assembly and around a tree, said tree engagement device being carried by a proximal end of said platform and configured to engage a portion of a tree.

9. A tree stand for supporting a user at a selected elevation above the ground in a tree, said tree stand comprising:
   a platform, said platform including a plurality of extendable panels, said plurality of extendable panels being positioned one next to another and secured one to another in a pivoting fashion, each of said extendable panels including a plurality of extension sections cooperating one with another in a telescoping fashion, each of said extension sections defining a top planar surface and a pair of oppositely disposed and downwardly depending channels, said channels being provided for receiving a successive one of said plurality of extension sections;
   a plurality of extension locking mechanisms, one each of said plurality of extension locking mechanisms for fixing a relative position between at least two each of said plurality of extension sections;
   a seat assembly pivotally connected to said platform;
   a securement assembly carried by said platform and said seat assembly for securing said tree stand to a tree, said securement assembly including a retaining strap and a tree engagement device, said retaining strap secured at first and second ends proximate an upper portion of said seat assembly and around a tree, said tree engagement device being carried by a proximal end of said platform and configured to engage a portion of a tree; and
   a pair of oppositely disposed support cables, each of said support cables being secured at one end to said seat assembly and at a second end to a distal end of said platform.

* * * * *